United States Patent [19]

Ami et al.

[11] 4,197,087
[45] Apr. 8, 1980

[54] LIQUID TYPE DYE PREPARATIONS

[75] Inventors: Kazuo Ami, Kyoto; Toshiyuki Iwahana, Hirakata; Junichi Fukuoka, Kyoto, all of Japan

[73] Assignee: Daido-Maruta Finishing Co. Ltd., Kyoto, Japan

[21] Appl. No.: 919,676

[22] Filed: Jun. 27, 1978

Related U.S. Application Data

[63] Continuation-in-part of Ser. No. 754,736, Dec. 27, 1976, abandoned.

[30] Foreign Application Priority Data

Dec. 29, 1975 [JP] Japan .................................. 50-156338
Dec. 29, 1975 [JP] Japan .................................. 50-156339
Dec. 29, 1975 [JP] Japan .................................. 50-156340

[51] Int. Cl.$^2$ .................... D06P 1/52; D06P 1/16; D06P 1/10; D06P 1/41
[52] U.S. Cl. ............................................. 8/62; 8/92; 8/21 C; 8/18 A; 8/174; 8/173; 8/34; 8/42 R; 260/42.21
[58] Field of Search ................... 8/92, 18 A, 174, 62, 8/173, 34, 42 R; 260/42.21

[56] References Cited

U.S. PATENT DOCUMENTS

| | | | |
|---|---|---|---|
| 1,976,679 | 10/1934 | Fikentscher et al. | 8/92 |
| 3,139,321 | 6/1964 | Clapp et al. | 8/34 |
| 3,369,855 | 2/1968 | Hartmark | 8/34 |
| 3,861,869 | 1/1975 | Schwindt et al. | 8/92 |
| 3,912,677 | 10/1975 | Baker et al. | 260/42.21 |
| 3,940,247 | 2/1976 | Sthare et al. | 8/173 |
| 4,036,587 | 7/1977 | Wolf et al. | 8/92 |
| 4,095,942 | 6/1978 | Dellian et al. | 8/62 |

FOREIGN PATENT DOCUMENTS

| | | | |
|---|---|---|---|
| 634844 | 1/1964 | Belgium . | |
| 1904309 | 10/1970 | Fed. Rep. of Germany | 8/62 |
| 1556681 | 3/1968 | France . | |
| 2045835 | 3/1971 | France . | |
| 43-24226 | 10/1968 | Japan . | |
| 48-39361 | 9/1973 | Japan . | |
| 917925 | 2/1963 | United Kingdom | 8/62 |

OTHER PUBLICATIONS

LaPiana, F. G., Amer. Dyestuff Reporter, May 1933, pp. 328–343.

*Primary Examiner*—Donald E. Czaja
*Assistant Examiner*—Maria S. Tungol
*Attorney, Agent, or Firm*—Sherman & Shalloway

[57] ABSTRACT

A dispersant-free liquid dye preparation comprising (1) a vehicle consisting of a particular water-soluble-COONH$_4$ group-containing polymer and a water-miscible organic solvent with or without water, and (2) a water-insoluble or sparingly water-soluble dye dispersed in the vehicle. The dye preparation can be prepared simply by mixing these ingredients and grinding the mixture. Textile articles can be dyed or printed in deep and brilliant shades by using dyeing baths or printing pastes containing the liquid dye preparation.

22 Claims, No Drawings

LIQUID TYPE DYE PREPARATIONS

This is a continuation-in-part application of application Ser. No. 754,736 filed Dec. 27, 1976, now abandoned.

This invention relates to novel liquid type dye preparations, and more specifically to liquid type dye preparations containing water-insoluble or sparingly water-soluble dyes which are dispersant-free and have improved dyeability, a process for preparation thereof, printing pastes or dyeing baths containing these preparations, and to a method for printing or dyeing textile articles using printing pastes or dyeing baths containing these preparations.

Water-insoluble and sparingly water-soluble dyes such as disperse dyes or vat dyes are generally dispersed in water with dispersants when used for dyeing or printing textile articles. This practice has the disadvantage that although the dispersants are required to disperse these dyes in water, they rather adversely affect the dyeability of these dyes on the textile articles. For example, when synthetic fibers such as polyester fibers are dyed or printed, the color yield is not entirely sufficient, and no satisfactory deep color consistency can be obtained. Moreover, the dyeings obtained tend to assume a dark hue. For this reason, practice has been prevalent heretofore to use the dyes in very high concentrations or together with deep dyeing assistants. When water-insoluble or sparingly water-soluble dyes are used together with dispersants for textile printing, the generally hydroscopic nature of surface active agents used as the dispersants causes the printed and dried printing paste to absorb water and induce bleed-out. This also causes soiling at the time of plait-down or batch-up.

It is an object of this invention to provide a liquid type dye preparation which does not contain a dispersant that adversely affects the dyeability of a water-insoluble or sparingly water-soluble dye, gives improved dyeing properties, and which particularly gives a dyeing having a high color yield, superior deep color consistency, good color fastness, and brilliant colors.

Another object of this invention is to provide a liquid type dye preparation having superior thermal stability and storage stability in which a water-insoluble or sparingly water-soluble dye is dispersed very finely and uniformly in a liquid medium.

Still another object of this invention is to provide a process for preparing such a liquid type dye preparation.

Still another object of this invention is to provide a printing paste or dyeing bath which can dye textile articles in deep and brilliant shades.

A further object of this invention is to provide a method for printing or dyeing textile articles using such a printing paste or dyeing bath.

Other objects and advantages of this invention will become apparent from the following description.

According to this invention, there is provided a liquid type dye preparation comprising:
(1) a vehicle consisting of:
  (a) a water-soluble —COONH$_4$ group-containing copolymer consisting essentially of
    (i) 3 to 50 mol% of a repeating structural unit of the formula

(ii) 50 to 97 mol% of a repeating structural unit of the formula

and
  (iii) 0 to 10 mol% of at least one repeating structural unit derived from a monomer of the formula

wherein $R_1$ and $R_2$, independently from each other, represent a hydrogen atom or methyl group, and $R_3$ represents an alkoxy group having up to 7 carbon atoms, or an alkoxycarbonyl group of which alkyl moiety has up to 7 carbon atoms, said water-soluble copolymer having a number average molecular weight of about 2,500 to about 5,000; and
  (b) a water-miscible organic solvent or both the water-miscible organic solvent and water; and
(2) a water-insoluble or sparingly water-soluble dye dispersed in the vehicle.

The primary feature of the invention is that a particular water-soluble co-polymer containing —COONH$_4$ groups is used instead of an ordinary dispersant in producing a dye preparation by dispersing a water-insoluble or sparingly water-soluble dye in water.

It has been found that according to the present invention, the use of the water-soluble co-polymer markedly improves the dispersion and color yield of a dye in textile articles although no clear reason has yet been able to be assigned to it. The water-soluble copolymer used in this invention can be selected from a wide range of —COONH$_4$ group-containing polymers which have a solubility in water of at least 100 g/100 g of water, preferably at least 200 g/100 g of water.

The water-soluble copolymer used in the invention may contain 3 to 50 mole%, preferably 5 to 35 mole%, more preferably 7 to 20 mole%, of the repeating structural unit of formula (I) derived from crotonic acid; and 50 to 97 mole%, preferably 75 to 95 mole%, and more preferably 80 to 93 mole%, of the repeating structural unit of formula (II) derived from vinyl acetate.

Advantageously, the water-soluble copolymer consists essentially of the repeating structural unit of formula (I) and the repeating structural unit of formula (II). If desired, it may comprise at most 10 mole%, preferably at most 5 mole%, of at least one repeating structural unit derived from a monomer of the formula

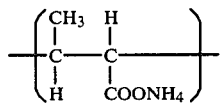

(I)

wherein $R_1$ and $R_2$, independently from each other, represent a hydrogen atom or methyl group, and $R_3$ represents an alkoxy group having up to 7 carbon atoms, or an alkoxycarbonyl group of which alkyl moiety has up to 7 carbon atoms.

In formula (III), the alkoxy group may be the one in which the alkyl moiety is linear or branched and contains up to 7 carbon atoms, preferably up to 5 carbon atoms. Examples are methoxy, ethoxy, n- or iso-propoxy, n-, iso-, sec- or tert-butoxy, and n-pentoxy. The alkoxycarbonyl group includes those in which the alkyl moiety has the same meaning as above. Examples are methoxycarbonyl, ethoxycarbonyl, n- or iso-propoxycarbonyl, and n-, iso-, sec- or tert-butoxycarbonyl.

Typical examples of the monomer of formula (III) are methyl acrylate, ethyl acrylate, n- or iso-propyl acrylate, n-, iso-, sec- or tert-butyl acrylate, methylvinyl ether, ethylvinyl ether, isobutylvinyl ether, methyl crotonate, ethyl crotonate, ethyl isoctoronate, ethyl itaconate, methyl methacrylate, ethyl methacrylate, n- or iso-propyl methacrylate, and n-, iso-, dec- or tert-butyl methacrylate. Of these, $C_{1-7}$ alkyl esters of acrylic acid or methacrylic acid are especially preferred.

The molecular weight of the water-soluble copolymer is one of the important factors in achieving the aforesaid objectives of the present invention. Specifically, the copolymer should have a number average molecular weight of about 2,500 to about 5,000, preferably about 2,800 to about 4,000, more preferably about 2,900 to about 3,600.

Both known and novel water-soluble polymer containing —COONH$_4$ groups can be easily prepared. For example, they can be easily prepared by co-polymerizing crotonic acid, and vinyl acetate, and optionally at least one monomer of formula (III) described hereinbefore, and neutralizing the resulting carboxyl-containing polymer with ammonia or an aqueous solution of ammonia.

The polymerization can be carried out by any known methods such as solution polymerization, emulsion polymerization, suspension polymerization, or bulk polymerization. Generally, the solution polymerization method is suitable for obtaining molecular weights of the above-specified range effectively.

Another characteristic feature of the present invention is that a water-miscible organic solvent or a mixture of water and a water-miscible organic solvent is used as the liquid medium for dispersing water-insoluble or sparingly water-soluble dyes, whereby the water-insoluble or sparingly water-soluble dyes can be dispersed uniformly in a very fine form in the liquid dyestuff preparation.

The water-miscible organic solvent may be any organic solvents which are inert to the dyes and do not substantially dissolve the dyes (even when they dissolve the dyes, the solubility of the dyes is less than 3% by weight). Generally, the organic solvent used in this invention is desirably selected from alcohols, ethers and esters. Examples of usable alcohols are monohydric lower alcohols such as methanol, ethanol, n- or iso-propanol, n- or tert-alcohol or allyl alcohol; polyhydric alcohols such as ethylene glycol, 1,2-propylene glycol, 1,3-propylene glycol, 1,3-butylene glycol, 2,3-butylene glycol, α-methyl-2,4-pentanediol, 2,4-pentanediol, 2,5-hexanediol, 2,4-heptanediol, diethylene glycol, dipropylene glycol, triethylene glycol, tripropylene glycol, polyethylene glycol (molecular weights 200, 300, 400, or 600), or glycerin; and ether alcohols such as ethylene glycol monomethyl ether, ethylene glycol monoethyl ether, ethylene glycol monobutyl ether, diethylene glycol monomethyl ether, diethylene glycol monoethyl ether, and diethylene glycol monobutyl ether. Examples of the ethers are diethyl ether, ethylene glycol diethyl ether, ethylene glycol dibutyl ether, diethylene glycol diethyl ether, and dioxane. Examples of the esters are ethyl acetate and amyl acetate. These solvents can be used either alone or in combination of two or more.

Especially preferred organic solvents that can be used in this invention are alcohols having a boiling point of at least 60° C., preferably monohydric or polyhydric alcohols having a molecular weight of not more than 600. Ethylene glycol has been found to be a very useful medium because it maintains the liquid type dye preparation stable over long periods of time.

The water-miscible organic solvent may be used as such, or as a dispersing medium in the form of a mixture with water. The latter mode of use is economically advantageous. The suitable proportion of the organic solvent is at least 10% by weight, preferably at least 25% by weight, based on the weight of the mixture.

The water-insoluble or sparingly water-soluble dyes used to produce the liquid type dye preparations in accordance with this invention are dyes which do not substantially dissolve in water, and include, for example, disperse dyes, vat dyes, metallized dyes, and cationic dyes, the disperse dyes being most suitable. Typical and non-limitative examples of these dyes are listed below. It should be noted that these are a mere exemplification, and other dyes not listed herein may be used equally in the present invention.

Disperse dyes

C. I. Disperse Yellow 71
C. I. Disperse Orange 73
C. I. Disperse Red 83
C. I. Disperse Violet 56
C. I. Disperse Blue 113
C. I. Disperse Blue 198

Vat dyes

C. I. Vat Yellow 12
C. I. Vat Orange 11
C. I. Vat Red 41
C. I. Vat Violet 15
C. I. Vat Blue 67
C. I. Vat Blue 22

Cationic dyes

C. I. Basic Yellow 24
C. I. Basic Red 51
C. I. Basic Orange 33
C. I. Basic Violet 34
C. I. Basic Blue 7

Metallized dyes

C. I. Acid Yellow 129
C. I. Acid Orange 86

C. I. Acid Red 211
C. I. Acid Violet 73
C. I. Acid Blue 171
C. I. Acid Blue 188

The proportions of the ingredients in the liquid dye preparation of this invention can be varied over wide ranges according, for example, to the purpose of use of the preparation. Generally, the proportion of the water-soluble co-polymer is at least 50 parts by weight per 100 parts by weight of the dye although it varies according to the type of the co-polymer. Although there is no particular upper limit, the use of too much co-polymer does not bring about any corresponding merit. Hence, the suitable amount of the water-soluble co-polymer is up to 250 parts by weight, preferably 80 to 200 parts by weight, more preferably 100 to 150 parts by weight, per 100 parts by weight of the dye.

The amount of the water-miscible organic solvent is neither critical, and can be varied according, for example, to the type of the solvent, or the type of the polymer and the dye. Generally, the amount of the solvent is at least 50 parts by weight per 100 parts by weight of the dye. The upper limit is preferably 1500 parts by weight. The suitable amount of the organic solvent is usually 80 to 1,000 parts by weight per 100 parts by weight of the dye. When it is used in combination with water, its amount is advantageously 80 to 200 parts by weight, especially 100 to 150 parts by weight. In the absence of water, the amount of the organic solvent is advantageously 100 to 1,000 parts by weight, particularly 200 to 800 parts by weight.

When water is used, the amount of water is at most 250 parts by weight, preferably at most 200 parts by weight, per 100 parts by weight of the dye.

The liquid type dye preparation of this invention can be directly used in applications to be described hereinbelow. If desired, adjuvants usually employed for preparation of printing pastes or dyeing baths from water-insoluble or sparingly water-soluble dyes, for example, conditioners such as polyethylene wax, may be incorporated in the liquid type dye preparation in small amounts (for example, not more than 5% by weight based on the total weight of the dye preparation).

The liquid type dye preparation provided by the present invention can be prepared by mixing the —COONH$_4$ group-containing co-polymer, the water-miscible organic solvent or both the organic solvent and water, and the water-insoluble or sparingly water-soluble dye, and grinding the mixture. Grinding can usually be carried out in various known apparatuses such as a roll mill, ball mill, sand grinder or attriter. The above ingredients in the specified proportions are charged into such an apparatus in any optional order, and sufficiently pulverized to a fine size.

Thus, the present invention can afford a dye preparation in which the water-insoluble or sparingly water-soluble dye is uniformly dispersed in a very fine form, generally in the form of ultrafine particles with a size of less than 1 micron, in a vehicle consisting of the —COONH$_4$ group-containing co-polymer and the water-miscible organic solvent with or without water.

The liquid type dye preparation of this invention can be applied in its as-obtained form to textile articles in order to dye them. Advantageously, it is mixed with a stock thickener or water, and used in the form of a printing paste or dyeing bath.

The printing paste can be prepared by mixing the liquid type dye preparation of this invention with a stock thickener. Any stock generally used for the preparation of printing pastes can be used. Examples of such stock thickeners are starch, sodium alginate, gum arabic, tragacanth rubber, etherified starch, carboxymethyl cellulose, polyvinyl alcohol, and the synthetic resin pastes described in British Patent Specification No. 1,335,586 and Japanese Patent Publication No. 18914/72. Furthermore, in the present invention, synthetic resin pastes obtained by completely neutralizing with ammonia or ammonia water copolymers of maleic acid with at least one copolymerizable monomer such as vinyl acetate, lower alkyl vinyl ethers, lower alkyl acrylates, or lower alkyl methacrylates, preferably a synthetic resin paste obtained by completely neutralizing a copolymer of 1 mole of maleic acid and 10 moles of vinyl acetate (having an average molecular weight of 2,500 to 4,000) with ammonia, are advantageously used.

If desired, it is possible to incorporate additives in the stock thickener. Examples of such additives are hydrotropes such as urea, glycerin, ethylene glycol monomethyl ether, ethylene glycol monoethyl ether or diethylene glycol monobutyl ether; dye dissolving agents such as thiodiethylene glycol; deep dyeing assistants such as polyoxyethylene pentaerithritol or polyoxyethylene oleyl ether; and defoamers such as octyl alcohol or decyl alcohol. Such additives are used in amounts conventionally employed.

Furthermore, if required, the water-soluble polymer described hereinabove can be incorporated in the stock thickener in an amount of up to 10% by weight based on the weight of the stock thickener so as to improve the hand of the dyed textile articles.

The stock thickener can be prepared as an emulsion, and in such a case, a white spirit (boiling point 170° to 180° C.) and an emulsifier can be added to the paste described above.

The mixing ratio between the liquid type dye preparation and the stock thickener can be varied over a wide range according, for example, to the method of printing, the structure of the textile article, and the color consistency required. Advantageously, the dye preparation of this invention can be uniformy mixed in any desired proportion with the stock thickener. Generally, however, the dye preparation is mixed in an amount of up to 50 parts by weight per 100 parts by weight of the stock thickener.

Textile articles can be printed with the printing paste so prepared by any desired method. Printing can be performed by using any of a flat screen printing machine, a rotary screen printing machine and a roll printing machine, and the printed textile articles can be treated by any fixing methods such as steam fixing, dry heat fixing or superheated steam fixing, and post-treated by a conventional method, for example, alkali soaping.

On the other hand, the dyeing bath can be prepared by mixing the liquid type dye preparation of this invention with water. The mixing proportion can be varied over a wide range according, for example, to the structure of the textile article and the color consistency required. For example, the dye preparation can be used in an amount of up to 10 parts by weight per 100 parts by weight of water. If desired, assistants, for example, levelling agents such as ammonium sulfate, anhydrous sodium sulfate or acetic acid, or surface-active agents can be added in appropriate amounts.

Textile articles can be dyed with the dyeing bath by any desired methods such as carrier dyeing, high temperature dyeing, or liquid flow dyeing. The dyeings are post-treated in a conventional manner.

Textile articles which can be printed or dyed with the liquid type dye preparation of this invention include, for example, natural fibers such as cellulosic fibers or wool; semi-synthetic fibers such as acetate, diacetate or triacetate; synthetic fibers such as polyamide, polyester, polyacrylonitrile or polypropylene fibers; and mixtures of these fibers, which are in the form of yarns, woven fabrics, knitted fabrics, or non-woven fabrics, etc.

The liquid dye preparation provided by this invention contains the water-insoluble or sparingly water-soluble dye in the form of very finely and uniformly dispersed particles, and has superior thermal stability and storage stability. It has a good color yield and superior dyeability irrespective of the type of the dyeing or printing method employed, and can afford dyeings having brilliant colors with high color fastness.

Moreover, since the liquid type dye preparation of this invention does not contain a dispersant, it has the advantage of causing no such troubles as in the conventional printing techniques, such as bleed-out, soil by rubbing or specks.

Still another advantage of this invention is that since the liquid type dye preparation of this invention has superior dyeability, the waste effluent from soaping after printing and fixing contains little unused dyes and can be treated easily.

The following Examples further illustrate the present invention. It should be noted that these Examples are merely illustrative, and various changes and modifications are possible without departing from the scope of the invention.

In the following Examples, the relative surface color density, color fastness to crocking and color fastness to perspiration of the dyeings were determined by the following methods.

(1) Relative surface color density

The spectral reflectance of the surface of a sample dyeing was measured using a spectrophotometer (Model 307, a product of Hitachi Limited) with a band width of 5 nm. The relative surface density K/S was calculated in accordance with the Kubelka-Munk equation [see P. Kubelka, F. Munk, Z. Tech. Phys. 12, 593, 1931].

$$K/S = (1-R)^2/2R$$

wherein R is the spectral reflectance measured, that is, the reflectance of a single-color light.

(2) Test on color fastness to crocking

A sample dyeing was rubbed with a white test cloth 100 times under the following conditions under a load of 200 g using a crock meter II type (a product of Nippon Senshoku Kikai K. K.), and then the degree of staining of the test white cloth was evaluated on a gray scale as grades 1 to 5.
Dry crocking:
Test performed while the white test cloth (cotton, plain-weave) was in the dry state
Wet crocking:
Test performed while the white test cloth (cotton, plain-weave) was in the wet state (3) Color fastness to perspiration Two sample dyeings were immersed in an artificial acidic or alkaline perspiration solution for 30 minutes, and then interposed between plain-weave cotton-polyester white cloths. The assembly was compressed at 10 pounds/cm² and 37° C.±5° C. for 24 hours using a perspiration tester, and then, the stained condition of the white cloth was examined. The evaluation of the staining was performed on a gray scale as grades 1 to 5.

| Artificial acidic perspiration solution | |
|---|---|
| L-histidine hydrochloride | 0.5 g |
| Sodium chloride | 5 g |
| Monosodium phosphate | 2.2 g |

To a mixture of the above compounds was added 15 ml of a 1/10 N aqueous solution of sodium hydroxide to adjust the pH of the mixture to 5.5, and then distilled water was added to make the entire volume 1 liter.

| Artificial alkaline perspiration solution | |
|---|---|
| L-histidine hydrochloride | 0.5 g |
| Sodium chloride | 5 g |
| Disodium phosphate | 5 g |

To a mixture of the above compounds was added 25 ml of a 1/10 N aqueous solution of sodium hydroxide to adjust the pH of the mixture to 8.0, and then distilled water was added to make the entire volume 1 liter.

EXAMPLE A

The —COONH₄ group-containing water-soluble co-polymers used in the following Examples 1-6 were prepared as follows.

A reactor equipped with a stirrer, a reflux condenser and a nitrogen gas inlet was charged with the monomers shown in Table 1 in the amounts indicated, and 150 parts by weight of dioxane as a solvent and 0.02 part by weight of azobisisobutyronitrile as a polymerization initiator were added. The reaction mixture was polymerized under reflux (95° to 100° C.) until there was substantially no increase in the viscosity of the mixture (usually 6 to 8 hours). After the polymerization, dioxane was distilled off at reduced pressure. A sufficient amount of 28% ammonia water was added to the residual polymer to neutralize it completely. The properties of the resulting water-soluble polymers are also shown in Table 1.

Table 1

| Monomers | Copolymers (parts by weight) | | | |
|---|---|---|---|---|
| | A | B | C | D |
| Crotonic acid | 10 | 10 | 10 | 8 |
| Vinyl acetate | 85 | 80 | 80 | 92 |
| Ethyl acrylate | — | 5 | — | — |
| n-Butyl acrylate | 5 | 5 | 10 | — |
| Number average molecular weight | ca 2900 | ca 2900 | ca 3000 | ca 2950 |
| Proportion of the repeating structural unit of formula (I) (mole %) | 9.76 | 9.7 | 9.5 | 7.6 |
| Proportion of the repeating structural unit of formula (II) (mole %) | 82.9 | 77.8 | 77.4 | 92.4 |

EXAMPLE 1

The dyes, water-soluble polymers, water-miscible organic solvents and water shown in Table 2 in the amounts shown in Table 2 were charged into an attriter (Model MA-158, a product of Mitsui Miike Seisakusho K.K.; rotating speed 120 rpm, stainless steel balls with a diameter of 3/16 inch), and mixed and dispersed for 2 hours.

Examination by a grind gage of the liquid type dye preparations obtained showed that the dye particles had a particle size of less than 1 micron, and were very uniform. Even when they were stored at room temperature for more than 3 months, their dispersibility scarcely changed.

Table 2

| Ingredients | Dye preparation (parts by weight) | | | |
|---|---|---|---|---|
| | A | B | C | D |
| C. I. Disperse Orange 73 | 15 | | | |
| C. I. Disperse Blue 198 | | 15 | | |
| C. I. Disperse Yellow 42 | | | | 15 |
| C. I. Vat Red 41 | | | 10 | |
| Polymer A | 20 | | | |
| Polymer B | | 20 | | |
| Polymer C | | | 15 | |
| Polymer D | | | | 20 |
| Ethyl alcohol | 15 | 10 | 45 | 15 |
| Isopropyl alcohol | 10 | 15 | 20 | 10 |
| Ethylene glycol | 5 | 5 | 5 | 5 |
| Ethylene glycol monobutyl ether | 5 | 5 | 5 | 5 |
| Water | 30 | 30 | | 30 |

EXAMPLE 2

A printing paste was prepared in the following manner using dye preparation A formed in Example 1.

9 Parts by weight of etherified starch ("Sorbitose C-5", a product of Scholten Company), 0.5 part by weight of sodium meta-nitrosulfonate, 0.5 part by weight of polyoxyethylene nonyl phenol ether (ethylene oxide 12 mole-added product), white spirit (b.p. 170°–180° C.) and 75 parts by weight of water were mixed uniformly by a high-speed homogenizer (a product of Nihon Tokushu Kikako K.K.) to form a stock thickener.

70 Parts by weight of the resulting stock thickener, 4 parts by weight of dye preparation B, 5 parts by weight of urea and 21 parts by weight of water were charged into a high-speed homogenizer, and stirred for 15 minutes at a speed of 5,000 rpm to form a printing paste B having a viscosity of 6,500 centipoises (determined by a B-type viscometer at 25° C.).

For comparison, printing pastes I and II were prepared in the same manner as above except that dye preparations I and II of the following formulations were used instead of the dye preparation A.

| | Dye preparation (parts by weight) | |
|---|---|---|
| | I | II |
| C. I. Disperse Orange 73 | 15 | 15 |
| Cresol/Schaeffer's acid/formaldehyde condensate (NEKAL SS) | 10 | 4 |
| Sodium naphthalene-sulfonate/formaldehyde condensate (TAMOL SS, a product of BASF) | 10 | 2 |
| Sodium dibutyl-naphthalene-sulfonate | 2 | 2 |
| Anhydrous sodium sulfate | 5 | 4 |
| Water | 58 | 73 |

The dye preparations I and II were prepared by mixing and dispersing the above ingredients for 2 hours in an attriter.

Polyester textured woven fabrics were printed using the resulting printing pastes A, I, and II by a rotary screen printer (RP-III, Stork Brabant B.V.) with an 80-mesh screen.

After drying, the printed fabrics were treated with high pressure steam at 2 kg/cm² for 30 minutes to fix the dye, washed with a reducing bath containing 2 g/liter of sodium hydrosulfite, 2 g/liter of sodium hydroxide and 3 g/liter of a nonionic surface active agent, washed further with water, and dried.

Thus, articles printed organge were obtained. The color shades, relative surface color densities and color fastness characteristics of the articles were determined, and the results are shown in Table 3.

Table 3

| Printing paste used | Relative surface color density (K/S) | Fastness to crocking | | Fastness to perspiration | | Color shade |
|---|---|---|---|---|---|---|
| | | Dry | Wet | Acid | Alkali | |
| A | 0.319 | 4–5 | 4–5 | 5 | 5 | Very brilliant orange |
| I | 0.292 | 3–4 | 3–4 | 4 | 4 | Dull orange |
| II | 0.290 | 3–4 | 3–4 | 4 | 4 | Dull orange |

EXAMPLE 3

Dye baths of the following formulation were prepared using the dye preparations A and B formed in Example 1, and polyester tricots were dyed at high temperatures under the conditions shown below.

| Dye bath formulation: | |
|---|---|
| Ammonium sulfate | 1 g/liter |
| Acetic acid (50% aqueous solution) | 1 cc/liter |
| Levelling agent [polyoxyethylene lauryl sulfate adduct (ethylene oxide 7 moles)] | 2% o.w.f. |
| Dye preparation B, C or D | 2.5% o.w.f. |
| Goods-to-liquor ratio | 1:30 |

Dyeing temperature and time:

The bath temperature was raised to 130° C. at a rate of 2.5° C./min., and the dyeing was performed at 130° C. for 60 minutes.

After the dyeing, the articles were washed with a reducing bath containing 2 g/liter of sodium hydrosulfite, 2 g/liter of sodium hydroxide, and 2 g/liter of a nonionic surface active agent, washed with water, and dried.

For comparison, polyester tricots were dyed in the same way as above except that the same dye preparation I as used in Example 2, and a dye preparation III of the following formulation were used instead of the dye preparations A and B.

|  | Dye Preparation III (parts by weight) |
|---|---|
| C.I. Disperse Blue 198 | 15 |
| Cresol/Schaeffer's acid/formaldehyde condensate (NEKAL SS) | 10 |
| Sodium naphthalene-sulfonate/formaldehyde condensate (TAMOL SS) | 10 |
| Sodium dibutyl-naphthalene-sulfonate | 2 |
| Anhydrous sodium sulfate | 5 |
| Water | 58 |

The relative surface color densities and color shades of the resulting dyeings were determined, and the results are shown in Table 4.

Table 4

| Dye preparation used | Relative surface color density (K/S) | Color shade |
|---|---|---|
| A | 0.200 | Very brilliant deep orange |
| I | 0.154 | Somewhat pale orange |
| B | 0.384 | Very brilliant turquoise blue |
| III | 0.367 | Dull turquoise blue |

EXAMPLE 4

Using the dye preparation C formed in Example 1, a design pattern was printed on a polyester taffeta by a roller printing machine (a product of Wakayama Iron Works Ltd., Japan) equipped with a gravure roll with a depth of 50 microns (100 lines/inch).

After drying, the printed taffeta was treated with high temperature steam at 180° C. for 8 minutes to fix the dye, washed with a reducing bath containing 2 g/liter of sodium hydrosulfate, 2 g/liter of sodium hydroxide and 3 g/liter of a nonionic surface active agent, washed with water, and dried.

For comparison, printing was performed in the same way as above except that a dye preparation IV of the following formulation was used instead of the dye preparation C.

|  | Dye preparation IV (parts by weight) |
|---|---|
| C.I. Vat Red 41 | 10 |
| Cresol/Schaeffer's acid/formaldehyde condensate (NEKAL SS) | 10 |
| Sodium dibutyl-naphthalene-sulfonate | 5 |
| Anhydrous sodium sulfate | 4 |
| Carboxymethyl cellulose | 3 |
| Water | 68 |

The relative surface color densities, color fastness characteristics, and color shades of the articles obtained were determined, and the results are shown in Table 5.

Table 5

| Dye preparation used | Relative surface color density (K/S) | Fastness to crocking Dry | Fastness to crocking Wet | Fastness to perspiration Acid | Fastness to perspiration Alkali | Color shade |
|---|---|---|---|---|---|---|
| C | 0.343 | 4-5 | 4-5 | 5 | 5 | Very brilliant red |
| IV | 0.310 | 4 | 3-4 | 4 | 4 | Dull red; marked bleed-out |

EXAMPLE 5

|  | Parts by weight |
|---|---|
| Maleic acid/vinyl acetate (1/10 molar ratio) copolymer ammonium salt* | 3 |
| Polymer D | 5 |
| White spirit (b.p. 170°-180° C.) | 30 |
| Polyoxyethylene oleyl ether (12 moles of ethylene oxide added) | 1 |
| Water | 61 |

The above ingredients were charged into a high-speed mixer, and thoroughly mixed to form an emulsion-type stock thickener having a viscosity of 60,000 centipoises (determined by a B-type viscometer at 25° C.).

Two parts by weight of the dye preparation D formed in Example 1, 60 parts by weight of the stock thickener, 5 parts by weight of urea, 0.5 part by weight of sodium metanitrobenzenesulfonate and 32.5 parts by weight of water were stirred for 15 minutes in a high-speed mixer to form a printing paste D.

Using the printing paste D, a nylon tricot was printed by a flat screen printing machine with a 130-mesh screen.

After drying, the printed fabric was treated at 0.3 kg/cm² for 20 minutes by a steam fixing method, subjected to alkali soaping (soda ash 2 g/liter, a nonionic surfactant 3 g/liter), washed with water, and dried.

A brilliant yellow printed fabric free from staining was obtained. The printed fabric had a very good hand.

The ammonium salt of the maleic acid/vinyl acetate copolymer was prepared as follows.

A reactor equipped with a stirrer, a reflux condenser and a nitrogen gas inlet was charged with 12 parts by weight of maleic acid and 88 parts by weight of vinyl acetate, and 150 parts by weight of methanol as a solvent and 0.02 part by weight of azobisbutyronitrile as a polymerization initiator were added. The reaction mixture was polymerized under reflux (70° to 75° C.) until there was no increase in the viscosity of the mixture (usually in 6 hours). After the polymerization, methanol was evaporated at reduced pressure, and a sufficient amount of 28% ammonia water was added to the remaining polymer to neutralize it. The number average molecular weight of the resulting product was 4,000.

EXAMLE 6

|  | Parts by weight |
|---|---|
| Dye preparation D | 5 |
| C. I. Vat Yellow 2 | 5 |
| Stock thickener prepared in Example 5 | 50 |
| Urea | 5 |
| Sodium metanitrobenzene-sulfonate | 0.5 |

|  | Parts by weight |
|---|---|
| Water | 34.5 |

The above ingredients were charged into a high speed mixer, and stirred for 15 minutes to form a printing paste.

A polyester/cotton (50/50) jersey was printed with the resulting printing paste by a rotary screen printing machine with an 80-mesh screen.

After drying, the printed jersey was baked at 200° C. for 45 seconds, padded with a solution containing 60 g/liter of sodium hydrosulfite, 100 g/liter of 45° Bé sodium hydroxide and a 2% starch paste by a blotch roll, and passed through a flash ager at 102° C. for 30 seconds, followed by oxidation and soaping in a customary manner.

A dyeing printed brilliant yellow and having good color fastness was obtained.

EXAMPLE 7

(A) Water-soluble crotonic acid/vinyl acetate copolymers used in this Example were prepared as follows.

A reactor equipped with a stirrer, a reflux condenser and a nitrogen gas inlet port was charged with 8 parts by weight of crotonic acid, 92 parts by weight of vinyl acetate and 150 parts by weight of dioxane or ethyl acetate as indicated in Table 6 below, and 0.02 part by weight of azobisisobutyronitrile (as a polymerization initiator) was added. The mixture was polymerized under reflux at the reaction temperature and for the periods of time indicated in Table 6. After the polymerization, the solvent was distilled off under reduced pressure. A sufficient amount of 28% ammonia solution was added to the residual polymer to neutralize it completely. The properties of the resulting water-soluble polymers are shown in Table 6.

Copolymer J shown in Table 6 did not undergo neutralization treatment with ammonia solution. Hence, copolymer J contained a free carboxyl group-containing repeating structural unit of the formula

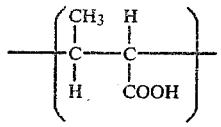

instead of the repeating structural unit of formula (I).

Table 6

|  | Crotonic acid/vinyl acetate copolymer | | | | | |
|---|---|---|---|---|---|---|
|  | E | F | G | H | I | J |
| Solvent for polymerization | Dioxane | Dioxane | Dioxane | Ethyl acetate | Ethyl acetate | Dioxane |
| Reaction temperature (°C.) | 95–100 | 95–100 | 95–100 | 85–90 | 85–90 | 95–100 |
| Reaction time (hr.) | 7 | 4 | 10 | 16 | 26 | 7 |
| Number average molecular weight | ca 2850 | ca 2100 | ca 5800 | ca 7500 | ca 21000 | ca 2850 |
| Proportion of the repeating structural unit of formula (I) (mole %) | 7.6 | 7.6 | 7.6 | 7.6 | 7.6 | — |
| Proportion of the repeating structural unit of formula (II) (mol %) | 92.4 | 92.4 | 92.4 | 92.4 | 92.4 | 92.4 |

(B) Twenty parts by weight of one of copolymers E to I prepared in (A) above, 15 parts by weight of C. I. Disperse orange 73, 15 parts by weight of ethyl alcohol, 5 parts by weight of ethylene glycol, 5 parts by weight of ethylene glycol monobutyl ether and 40 parts by weight of water were put into an attriter (Model MA-158, a product of Mitsui Miike Seisakusho K.K.; rotating speed 120 rpm, stainless steel balls 3/16 inch in diameter), and mixed and dispersed for 2 hours. Thus, dye preparations E to I were prepared.

The dispersion stability of each of the dye dispersion as diluted with water was measured by the following procedure.

Fifty grams of the dye preparation was placed in a precipitation tube. The tube was mounted on a centrifugal separator, and centrifuged by a centrifugal force of 2,500 G for 30 minutes. The precipitation tube was then taken out, and precisely divided into 25 g of an upper layer and 25 g of lower layer. The upper layer was thoroughly stirred, and one gram of it was precisely weighed and taken out. It was poured with water into a 500 ml graduated flask to make the total amount 500 ml. This solution was thoroughly stirred and 1 ml of it was taken by a pipette. It was transferred into a 100 ml graduated flask and dissolved in an aqueous solution of acetone and acetic acid (80% of acetone and 0.1% acetic acid) to make the total amount 100 ml. The resulting solution is designated as solution A. On the other hand, the lower layer was stirred and then diluted in the same way as above. The resulting solution is designated as solution B.

The absorbances of the solutions A and B were measured by a spectrophotometer, and the dispersion stability of the dye preparation was calculated in accordance with the following equation.

$$\text{Dispersion stability (\%)} = \frac{2A}{A+B} \times 100$$

wherein
A: the absorbance of solution A
B: the absorbance of solution B

The results obtained are shown in Table 7.

(C) Twelve parts by weight of etherified starch ("Sorbitose C-5", a product of Scholten Company), 0.5 part by weight of sodium meta-nitrosulfonate and 87.5 parts by weight of water were uniformly mixed by a high-speed homogenizer (a product of Nihon Tokushu Kikako K.K.) to form a stock thickener. Sixty parts by weight of the resulting stock thickener, 4 parts by weight of one of the dye preparations E to H, 5 parts by weight of urea and 31 parts by weight of water were placed in a high-speed homogenizer and stirred at a speed of 5,000 rpm for 15 minutes to form printing pastes E to H having a viscosity, as measured by a B-type viscometer at 25° C., of 8,500 centipoises.

A polyester jersey was printed by each of the printing pastes E to H by a flat screen printer (a product of Busen Company) with a 130-mesh screen. After drying, the printed articles were treated for 7 minutes with high temperature steam heated at 180° C. The printed articles were washed, and then cleaned in a reduction bath containing 2 g/liter of sodium hydrosulfite, 2 g/liter of sodium hydroxide and 3 g/liter of a nonionic surface active agent, washed with water, and dried.

The dye densities of the surfaces of the dyed articles were as shown in Table 7 below.

Table 7

| Copolymer | E | F | G | H | I | J |
|---|---|---|---|---|---|---|
| Dye preparation | E | F | G | H | I | J |
| Dispersion stability | 97.6 | 82.4 | 70.9 | 65.0 | —(a) | —(b) |
| Printing paste | E | F | G | H | | |
| Relative surface color density (K/S) | 0.368 | 0.205 | 0.190 | 0.204 | | |

(a)A dye preparation could not be formed from copolymer I because it was highly viscous.
(b)Copolymer J did not undergo neutralization with ammonia solution, and had extremely poor water-solubility. Hence, it coagulated during the production of dye preparation, and a feasible dye preparation could not be formed from it.

These experimental results show that to prepare liquid type dye preparations of high quality, it is very important and essential that the water-soluble copolymer should have a number average molecular weight of about 2,500 to about 5,000.

EXAMPLE 8

(A) Water-soluble copolymers used in this Example were prepared as follows

Under a stream of nitrogen gas, a reactor equipped with a stirrer was charged with the monomers indicated in Table 7 in the amounts indicated, about 150 parts by weight of dioxane or methyl ethyl ketone as a solvent, and 0.02 part by weight of azobisisobutyronitrile as a polymerization initiator.

The reaction was performed at a temperature of 70° to 100° C. under reflux until there was no increase in viscosity in the mixture (8 to 50 hours). After the polymerization, the solvent was removed under reduced pressure. The reaction mixture was completely neutralized with 28% ammonia solution.

Thus, the water-soluble copolymers shown in Table 8 were obtained.

Table 8

| Monomers | Water-soluble copolymers (parts by weight) | | | | | | | | | | |
|---|---|---|---|---|---|---|---|---|---|---|---|
| | K | L | M | N | O | P | Q | R | S | T | U |
| Crotonic acid | 3 | 3 | 5 | 5 | 10 | 10 | 20 | 20 | 50 | 50 | 20 |
| Methyl methacrylate | — | — | — | — | — | — | — | — | — | 5 | — |
| Ethyl methacrylate | — | 5 | — | — | — | — | — | — | — | — | — |
| n-Butyl methacrylate | — | — | — | 5 | — | 5 | — | 5 | — | — | — |
| Vinyl acetate | 97 | 92 | 95 | 90 | 90 | 85 | 80 | 75 | 50 | 45 | 80 |
| Number average molecular weight | ca 3100 | ca 3550 | ca 3100 | ca 3550 | ca 3000 | ca 3300 | ca 2900 | ca 3000 | ca 2600 | ca 2410 | ca 2500 |
| Proportion of the repeating structural unit of formula (I) (mole %) | 2.2 | 2.1 | 3.6 | 3.5 | 7.2 | 9.8 | 14.4 | 13.3 | 36.0 | 35.7 | 14.4 |
| Proportion of the repeating structural unit of formula (II) (mole %) | | | | | | | | | | | |

(B) A sand grinder (Model ½ G; a product of Igarashi Zairyo K. K.) was charged with 15 parts by weight of C. I. Disperse Orange 73, C. I. Disperse Yellow 70 or C. I. Disperse Blue 113, 12 parts by weight of one of the water-soluble copolymers K to U prepared in (A) above, 4 parts by weight of ethyl alcohol, 2 parts by weight of ethylene glycol 2 parts by weight of ethylene glycol monobutyl ether and 65 parts by weight of water. These materials were agitated at high speed at a rotating speed of 1,800 rpm for 2 hours using glass beads, 1.5 to 2.0 mm in diameter, as a medium. Dye preparations were prepared.

For comparison, the above procedure was repeated except that a mixture of 15 parts by weight of C. I. Disperse Orange 73, C. I. Disperse Yellow 79 or C. I. Disperse Blue 113, 20 parts by weight of a cresol/Schaeffer's acid/formaldehyde condensate, 2 parts by weight of sodium dibutylnaphthalenesulfonate, 5 parts by weight of anhydrous sodium sulfate and 58 parts by weight of water was placed into the same sand grinder. Thus, dye preparations were formed which contained commercially available surfactants instead of the water-soluble copolymer.

(C) Stock thickeners having the formulations shown in Table 9 were prepared by an ordinary method using a high-speed homogenizer (a product of Nihon Tokushu Kikako K. K.).

Table 9

| Ingredients | Stock thickeners (parts by weight) | | |
|---|---|---|---|
| | I | II | III |
| Etherified starch (a product of Sholten Company) | 12 | 12 | 9 |
| Sodium metanitro benzenesulfonate | 0.5 | — | — |
| Sodium hypochlorite | — | 0.5 | 0.5 |
| Polyoxyethylene nonyl phenol ether (adduct containing 12 moles of ethylene oxide) | — | — | 0.5 |
| White spirit (b.p. 190°–180° C.) | — | — | 15 |
| Malic acid (50% aqueous solution) | 0.1 | 0.1 | 0.1 |
| Water | 87.4 | 87.4 | 74.9 |

A high-speed homogenizer was charged with 5, 6 or 7 parts by weight of each of the dye preparations formed in (B) above, 60 parts by weight of each of the stock thickeners prepared above, and 35, 34 or 33 parts by weight of water, and printing pastes were prepared in a customary manner. The viscosities of these printing pastes were 8500 centipoises (at 25° C.) when measured by a B-type viscometer.

Each of the printing pastes was applied to a polyester jersey by a flat screen printer (a product of Busen Company) using a 130-mesh screen.

After drying, the printed articles were treated with high temperature steam at 180° C. for 7 minutes, washed with a reduction bath containing 2 g/liter of sodium hydrosulfite, 2 g/liter of sodium hydroxide and 3 g/liter of a nonionic surface-active agent, further washed with water, and dried.

The $\theta$ values, dyeing strengths and fastness characteristics of the resulting dyeings were measured, and the results are shown in Tables 10 to 12. In these tables, o.w.p. represents the weight percent of dye preparation in the printing paste.

The density index $\theta$ and dyeing strength were measured by the following methods.

$\theta$ value

The spectral reflectance $(\rho_\lambda)$ of the surface of a dyeing was measured by a spectrophotometer (Model EPR-II, a product of Hitachi Limited). From the measured value, tristimulus values X, Y and Z (see 1931, CIE 2°) were determined. After X, Y and Z are converted to T.D.S. of the DIN surface system, the $\theta$ value is calculated in accordance with the Paul Rabe's equation [see Paul Rabe, Am. Dyestuff Rept., 46, 504 (1957)]. The $\theta$ value is an index of dye density on the surface of the dyeing, and represents the depth of the color of the dyeing.

Dyeing strength

Measured by the method described in Paul Rabe, Am. Dyestuff Rept., 46, 504 (1957).

Table 10

| | Dye preparation | | (Stock thickener I) | | | | | | Fastness to crocking | | Fastness to perspiration | |
|---|---|---|---|---|---|---|---|---|---|---|---|---|
| | | Water- | 5% (o.w.p.) | | 6% (o.w.p.) | | 7% (o.w.p.) | | | | | |
| Run No. | Dyestuff | soluble copolymer | $\theta$-value | Dyeing strength | $\theta$-value | Dyeing strength | $\theta$-value | Dyeing strength | Dry | Wet | Acid | Alkali |
| 1 | C. I. Disperse Orange 73 | K | 7.42 | 168 | 7.52 | 180 | 7.59 | 183 | 4–5 | 4–5 | 5 | 5 |
| 2 | C. I. Disperse Orange 73 | L | 7.39 | 156 | 7.44 | 146 | 7.56 | 169 | 4–5 | 4–5 | 5 | 5 |
| 3 | C. I. Disperse Orange 73 | M | 7.48 | 196 | 7.57 | 200 | 7.62 | 194 | 4–5 | 4–5 | 5 | 5 |
| 4 | C. I. Disperse Orange 73 | N | 7.42 | 168 | 7.52 | 180 | 7.57 | 171 | 4–5 | 4–5 | 5 | 5 |
| 5 | C. I. Disperse Orange 73 | O | 7.52 | 216 | 7.52 | 180 | 7.59 | 180 | 5 | 4–5 | 5 | 5 |
| 6 | C. I. Disperse Orange 73 | P | 7.42 | 168 | 7.52 | 180 | 7.57 | 171 | 4–5 | 4–5 | 5 | 5 |
| 7 | C. I. Disperse Orange 73 | Q | 7.39 | 156 | 7.48 | 163 | 7.55 | 164 | 4–5 | 4–5 | 5 | 5 |
| 8 | C. I. Disperse Orange 73 | R | 7.42 | 168 | 7.52 | 180 | 7.57 | 171 | 4–5 | 4–5 | 5 | 5 |
| 9 | C. I. Disperse Orange 73 | S | 7.40 | 164 | 7.50 | 171 | 7.57 | 171 | 4–5 | 4–5 | 5 | 5 |
| 10 | C. I. Disperse Orange 73 | T | 7.40 | 164 | 7.50 | 171 | 7.57 | 171 | 4–5 | 4–5 | 5 | 5 |
| 11 | C. I. Disperse Orange 73 | U | 7.48 | 196 | 7.60 | 217 | 7.68 | 235 | 5 | 5 | 5 | 5 |
| 12 | C. I. Disperse Orange 73 | Comparison | 7.17 | 100 | 7.27 | 100 | 7.34 | 100 | 3–4 | 3–4 | 4 | 4 |

Table 11

(Stock thickener II)

| Run No. | Dye preparation Dyestuff | Water-soluble copolymer | 5% (o.w.p.) θ-value | 5% (o.w.p.) Dyeing strength | 6% (o.w.p.) θ-value | 6% (o.w.p.) Dyeing strength | 7% (o.w.p.) θ-value | 7% (o.w.p.) Dyeing strength | Fastness to crocking Dry | Fastness to crocking Wet | Fastness to perspiration Acid | Fastness to perspiration Alkali |
|---|---|---|---|---|---|---|---|---|---|---|---|---|
| 13 | C. I. Disperse Yellow 79 | K | 7.45 | 300 | 7.48 | 275 | 7.51 | 271 | 5 | 5 | 5 | 5 |
| 14 | C. I. Disperse Yellow 79 | L | 7.45 | 300 | 7.48 | 275 | 7.50 | 257 | 5 | 5 | 5 | 5 |
| 15 | C. I. Disperse Yellow 79 | M | 7.49 | 340 | 7.51 | 317 | 7.52 | 286 | 5 | 5 | 5 | 5 |
| 16 | C. I. Disperse Yellow 79 | N | 7.47 | 320 | 7.49 | 283 | 7.51 | 271 | 5 | 5 | 5 | 5 |
| 17 | C. I. Disperse Yellow 79 | O | 7.43 | 280 | 7.45 | 250 | 7.48 | 236 | 5 | 5 | 5 | 5 |
| 18 | C. I. Disperse Yellow 79 | P | 7.40 | 260 | 7.45 | 250 | 7.48 | 236 | 5 | 5 | 5 | 5 |
| 19 | C. I. Disperse Yellow 79 | Q | 7.44 | 290 | 7.46 | 258 | 7.48 | 236 | 5 | 5 | 5 | 5 |
| 20 | C. I. Disperse Yellow 79 | R | 7.40 | 260 | 7.45 | 250 | 7.48 | 236 | 5 | 5 | 5 | 5 |
| 21 | C. I. Disperse Yellow 79 | S | 7.39 | 252 | 7.44 | 242 | 7.47 | 229 | 5 | 5 | 5 | 5 |
| 22 | C. I. Disperse Yellow 79 | T | 7.41 | 266 | 7.44 | 242 | 7.46 | 221 | 5 | 5 | 5 | 5 |
| 23 | C. I. Disperse Yellow 79 | U | 7.44 | 290 | 7.46 | 258 | 7.48 | 236 | 5 | 5 | 5 | 5 |
| 24 | C. I. Disperse Yellow 79 | Comparison | 7.08 | 100 | 7.09 | 100 | 7.16 | 100 | 5 | 4 | 4 | 4 |

Table 12

(Stock thickener III)

| Run No. | Dye preparation Dyestuff | Water-soluble copolymer | 5% (o.w.p.) θ-value | 5% (o.w.p.) Dyeing strength | 6% (o.w.p.) θ-value | 6% (o.w.p.) Dyeing strength | 7% (o.w.p.) θ-value | 7% (o.w.p.) Dyeing strength | Fastness to crocking Dry | Fastness to crocking Wet | Fastness to perspiration Acid | Fastness to perspiration Alkali |
|---|---|---|---|---|---|---|---|---|---|---|---|---|
| 25 | C. I. Disperse Blue 113 | K | 6.82 | 108 | 6.98 | 108 | 7.09 | 107 | 4–5 | 4–5 | 5 | 5 |
| 26 | C. I. Disperse Blue 113 | L | 6.86 | 112 | 6.98 | 108 | 7.10 | 109 | 5 | 4–5 | 5 | 5 |
| 27 | C. I. Disperse Blue 113 | M | 7.05 | 142 | 7.13 | 132 | 7.21 | 127 | 5 | 4–5 | 5 | 5 |
| 28 | C. I. Disperse Blue 113 | N | 7.13 | 158 | 7.27 | 162 | 7.37 | 159 | 5 | 4–5 | 5 | 5 |
| 29 | C. I. Disperse Blue 113 | O | 7.11 | 154 | 7.19 | 143 | 7.27 | 139 | 5 | 4–5 | 5 | 5 |
| 30 | C. I. Disperse Blue 113 | P | 7.10 | 152 | 7.17 | 137 | 7.25 | 136 | 5 | 4–5 | 5 | 5 |
| 31 | C. I. Disperse Blue 113 | Q | 7.02 | 136 | 7.15 | 135 | 7.25 | 136 | 5 | 4–5 | 5 | 5 |
| 32 | C. I. Disperse Blue 113 | R | 7.02 | 136 | 7.15 | 135 | 7.25 | 136 | 5 | 4–5 | 5 | 5 |
| 33 | C. I. Disperse Blue 113 | S | 6.91 | 118 | 7.04 | 117 | 7.16 | 118 | 5 | 4–5 | 5 | 5 |
| 34 | C. I. Disperse | T | 6.86 | 112 | 7.00 | 110 | 7.13 | 113 | 4–5 | 4–5 | 5 | 5 |

Table 12-continued

| | Dye preparation | | (Stock thickener III) | | | | | | Fastness to crocking | | Fastness to perspiration | |
|---|---|---|---|---|---|---|---|---|---|---|---|---|
| | | Water- | 5% (o.w.p.) | | 6% (o.w.p.) | | 7% (o.w.p.) | | | | | |
| Run No. | Dyestuff | soluble copolymer | θ-value | Dyeing strength | θ-value | Dyeing strength | θ-value | Dyeing strength | Dry | Wet | Acid | Alkali |
| 35 | C. I. Disperse Blue 113 | U | 6.99 | 130 | 7.13 | 132 | 7.27 | 139 | 5 | 4–5 | 5 | 5 |
| 36 | C. I. Disperse Blue 113 | Comparison | 6.76 | 100 | 6.92 | 100 | 7.04 | 100 | 4 | 3–4 | 4 | 4 |

What we claim is:

1. A liquid type dye preparation comprising:
   (1) a vehicle consisting of
      (a) a water-soluble copolymer consisting essentially of
         (i) 3 to 50 mol% of a repeating structural unit of the formula

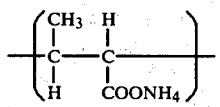

(ii) 50 to 97 mol% of a repeating structural unit of the formula

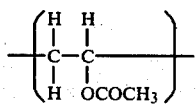

and
         (iii) 0 to 10 mol% of at least one repeating structural unit derived from a monomer of the formula

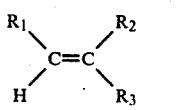

wherein $R_1$ and $R_2$, independently from each other, represent a hydrogen atom or methyl group, and $R_3$ represents an alkoxy group having up to 7 carbon atoms, or an alkoxycarbonyl group of which alkyl moiety has up to 7 carbon atoms, said water-soluble copolymer having a number average molecular weight of about 2,500 to about 5,000; and
      (b) a water-miscible organic solvent or both the water-miscible organic solvent and water; and
   (2) a water-insoluble or sparingly water-soluble dye dispersed in the vehicle.

2. The preparation of claim 1 wherein said water-soluble copolymer has a number average molecular weight of about 2,800 to about 4,000.

3. The preparation of claim 1 wherein said water-soluble copolymer consists essentially of (i) 3 to 50 mol% of the repeating structural unit of formula (I) and (ii) 50 to 97 mol% of the repeating structural unit of formula (II).

4. The preparation of claim 1 wherein said water-soluble copolymer consists essentially of (i) 5 to 35 mol% of the repeating structural unit of formula (I); (ii) 75 to 95 mol% of the repeating structural unit of formula (II); and (iii) 0 to 5 mol% of the repeating structural unit derived from the monomer of formula (III).

5. The preparation of claim 1 wherein said water-soluble copolymer consists essentially of (i) 7 to 20 mol% of the repeating structural unit of formula (I); (ii) 80 to 93 mol% of the repeating structural unit of formula (II); and (iii) 0 to 5 mol% of the repeating structural unit derived from the monomer of formula (III).

6. The preparation of claim 1 wherein said monomer of formula (III) is a $C_{1-7}$ alkyl ester of acrylic acid or methacrylic acid.

7. The preparation of claim 1 wherein said water-soluble organic solvent is selected from the group consisting of alcohols, ethers and esters.

8. The preparation of claim 1 wherein said water-miscible organic solvent is a monohydric or polyhydric alcohol having a molecular weight of not more than 600.

9. The preparation of claim 1 wherein said water-miscible organic solvent is ethylene glycol.

10. The preparation of claim 1 wherein said water-insoluble or sparingly water-soluble dye is selected from the group consisting of disperse dyes, vat dyes, metallized dyes and cationic dyes.

11. The preparation of claim 1 wherein said water-insoluble or sparingly water-soluble dye is a disperse dye.

12. The preparation of claim 1 wherein the amount of said water-soluble co-polymer is at least 50 parts by weight per 100 parts by weight of the dye.

13. The preparation of claim 1 wherein the amount of said water-soluble co-polymer is 80 to 200 parts by weight per 100 parts by weight of the dye.

14. The preparation of claim 1 wherein the amount of the water-soluble copolymer is 100 to 150 parts by weight, per 100 parts by weight of the dye.

15. The preparation of claim 1 wherein the amount of said water-miscible organic solvent is at least 50 parts by weight per 100 parts by weight of the dye.

16. The preparation of claim 1 wherein said amount of said water-miscible organic solvent is 80 to 1,000 parts by weight per 100 parts by weight of the dye.

17. The preparation of claim 1 wherein the vehicle (1) consists of the water-soluble copolymer (a) and the water-miscible organic solvent (b) in an amount of 100 to 1,000 parts by weight, per 100 parts by weight of the dye.

18. The preparation of claim 1 wherein the amount of water is at most 250 parts by weight per 100 parts by weight of the dye.

19. The preparation of claim 1 wherein the vehicle (1) consists of (a) the water-soluble copolymer and (b) a mixture of the water-miscible organic solvent and water wherein the amount of the water-miscible organic solvent is 80 to 200 parts by weight, per 100 parts by weight of the dye and wherein the amount of water is at most 200 parts by weight, per 100 parts by weight of the dye.

20. A process for producing a liquid dye preparation having a water-insoluble or sparingly water-soluble dye uniformly and finely dispersed therein, which comprises mixing
(i) a vehicle consisting of:
  (a) a water-soluble copolymer consisting essentially of
    (i) 3 to 50 mol% of a repeating structural unit of the formula

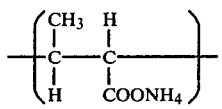

(ii) 50 to 97 mol% of a repeating structural unit of the formula

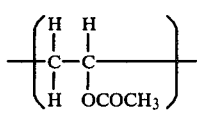

and
(iii) 0 to 10 mol% of at least one repeating structural unit derived from a monomer of the formula

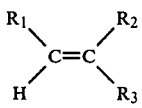

wherein $R_1$ and $R_2$, independently from each other, represent a hydrogen atom or methyl group, and $R_3$ represents an alkoxy group having up to 7 carbon atoms, or an alkoxycarbonyl group of which alkyl moiety has up to 7 carbon atoms, said water-soluble copolymer having a number average molecular weight of about 2,500 to about 5,000; and
  (b) a water-miscible organic solvent or both the water-miscible organic solvent and water; and
(2) a water-insoluble or sparingly water-soluble dye and grinding the mixture.

21. A printing paste of dyeing bath comprising
(A) a liquid dyestuff preparation comprising
(1) a vehicle consisting of:
  (a) a water-soluble copolymer consisting essentially of
    (i) 3 to 50 mol% of a repeating structural unit of the formula

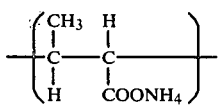

(ii) 50 to 97 mol% of a repeating structural unit of the formula

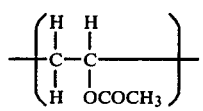

and
(iii) 0 to 10 mol% of at least one repeating structural unit derived from a monomer of the formula

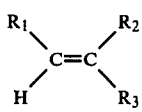

wherein $R_1$ and $R_2$, independently from each other, represent a hydrogen atom or methyl group, and $R_3$ represents an alkoxy group having up to 7 carbon atoms, or an alkoxycarbonyl group of which alkyl moiety has up to 7 carbon atoms, said water-soluble copolymer having a number average molecular weight of about 2,500 to about 5,000; and
  (b) a water-miscible organic solvent or both the water-miscible organic solvent and water;
(2) a water-insoluble or sparingly water-soluble dye dispersed in the vehicle; and
(B) a stock thickener or water.

22. A method for printing or dyeing textile articles, which comprises printing or dyeing a textile article using a printing paste or dyeing bath containing a liquid dye preparation comprising
(1) a vehicle consisting of:
  (a) a water-soluble copolymer consisting essentially of
    (i) 3 to 50 mol% of a repeating structural unit of the formula

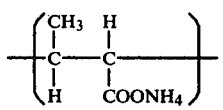

(ii) 50 to 97 mol% of a repeating structural unit of the formula

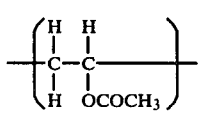

and
(iii) 0 to 10 mol% of at least one repeating structural unit derived from a monomer of the formula

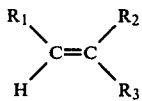

wherein $R_1$ and $R_2$, independently from each other, represent a hydrogen atom or methyl group, and $R_3$ represents an alkoxy group having up to 7 carbon atoms, or an alkoxycarbonyl group of which alkyl moiety has up to 7 carbon atoms, said water-soluble copolymer having a number average weight of about 2,500 to about 5,000; and (b) a water-miscible organic solvent or both the water-miscible organic solvent and water; and (2) a water-insoluble or sparingly water-soluble dye dispersed in the vehicle.

* * * * *